United States Patent [19]
Waas

[11] Patent Number: 4,860,951
[45] Date of Patent: Aug. 29, 1989

[54] HEATING APPARATUS, ESPECIALLY A VEHICLE AUXILIARY HEATING APPARATUS

[75] Inventor: Peter Waas, Munich, Fed. Rep. of Germany

[73] Assignee: Webasto-Werk W. Baier GmbH & Co., Gauting, Fed. Rep. of Germany

[21] Appl. No.: 936,356

[22] Filed: Dec. 1, 1986

[30] Foreign Application Priority Data

Dec. 13, 1985 [DE] Fed. Rep. of Germany ....... 3544024

[51] Int. Cl.$^4$ .............................................. G05D 23/00
[52] U.S. Cl. .................................. 237/2 A; 237/12.3 B
[58] Field of Search .................... 237/12.3 C, 12.3 A, 237/12.3 B, 2 A, 12.3 R

[56] References Cited

U.S. PATENT DOCUMENTS

| | | | |
|---|---|---|---|
| 3,304,004 | 2/1967 | Hraboweckyj | 237/12.3 C |
| 4,010,895 | 3/1977 | Kofink et al. | 237/12.3 C |
| 4,018,380 | 4/1977 | Baier | 237/12.3 C |
| 4,171,771 | 10/1979 | Colthorpe et al. | 236/25 A |

FOREIGN PATENT DOCUMENTS 2534208  2/1977  Fed. Rep. of Germany ..... 237/12.3 C

*Primary Examiner*—Henry A. Bennet
*Attorney, Agent, or Firm*—Sixbey, Friedman, Leedom & Ferguson

[57] ABSTRACT

A heating apparatus, which is intended, particularly, for incorporation into a vehicle liquid heat exchange circuit has a control device, to which a liquid flow measuring device is connected. If the liquid flow measuring device detects that a predetermined liquid flow has been reached or exceeded, the control device of the heating apparatus can be put into operation as a function of other control variables. If, on the other hand, this predetermined liquid flow is not reached or exceeded, the control device, by its connection to the liquid flow measuring device, prevents turning on of the heating apparatus. As a result, the heating apparatus is turned on and delivers heat only if a heating requirement exists.

20 Claims, 1 Drawing Sheet

HEATING APPARATUS, ESPECIALLY A VEHICLE AUXILIARY HEATING APPARATUS

BACKGROUND & SUMMARY OF THE INVENTION

The invention relates to a heating apparatus, especially a vehicle auxiliary heating apparatus, which is intended for incorporation in a vehicle liquid heat exchange circuit. Such a heating apparatus has a control device, by which the working of the heating apparatus is controlled.

Often when such a heating apparatus is incorporated into a vehicle liquid heat exchange circuit, a regulating valve is provided by which the flow of the heat exchange liquid, such as coolant or water, is changed as a function of the desired heating requirement. Now, if this regulating valve, for example, is closed or only minimally opened and if the turn-on temperature of the heating apparatus is reached, then the heating apparatus is put into operation, although no heating requirement for heating purposes exists.

Therefore, the object of the invention is to improve a heating apparatus, especially a vehicle auxiliary heating apparatus of the type initially mentioned, so that turning on of the heating apparatus is effectively prevented if no liquid flow through the heating apparatus exists.

According to the invention, in this connection, a heating apparatus of the initially mentioned type is distinguished by the fact that a liquid flow measuring device is provided, which is connected to the control device of the heating apparatus, so that the heating apparatus can be activated only when a predetermined liquid flow is exceeded.

In the case of the heating apparatus according to the invention, therefore, the liquid flow is detected with the help of the liquid flow measuring device and turning on of the apparatus is prevented by the control device, if the liquid flow is minimal or almost zero. As a result, a localization of heat in the heating apparatus, which possibly can lead to a tripping of the temperature safety device, is avoided, so that a forced turning off of the heating apparatus under these circumstances no longer occurs. With the help of the liquid flow measuring device provided according to the invention, therefore, the heating apparatus is not started by the control deice if, for example, the liquid pump of the heating apparatus is defective, a regulating valve in the vehicle heating circuit is closed or no liquid flows in the heating circuit for any other reason. Also, a frequent starting of the apparatus and the consumption of electric energy linked thereto are avoided.

The liquid flow measuring device can operate continuously, and thus the control device of the heating apparatus can continuously deliver an appropriate signal. Alternatively, the liquid flow measuring device can be designed as a threshold value switch so that it acts as a liquid flow monitor and is turned off only as a function of the predetermined threshold value of the heating apparatus, if, for example, this preset threshold value is exceeded.

Further, various other possibilities exist, depending upon the type of the liquid flow measuring device that is used. Thus, for example, a volumetric flowmeter or a turbine flowmeter may be used as a measuring device. Also, the liquid flow can be detected by the pressure difference in the heating apparatus or, alternatively, by the flow rate. In detecting the flow rate of the liquid, advantageously, a pitot tube arrangement is used, whereby the liquid pipes required for this purpose can, optionally, be integrated in the heating apparatus.

Since the liquids used as a coolant in vehicles contain additives and the like, the viscosity of the liquid changes as a function of temperature, so that a pressure difference measurement device is preferable for use as the liquid flow measuring device, from an accuracy standpoint. On the other hand, a liquid flow measuring device that detects the flow rate of the liquid is simpler from a design standpoint.

If a liquid flow measuring device is used, the temperature safety device on the heating apparatus can be eliminated and the liquid flow measuring device could, at the same time, take over the function of the temperature safety device.

With the formation of a flow monitor, the threshold value switch especially in the form of a microswitch can also, preferably, work together with the regulating valve in the liquid heat exchange circuit, so that the control device of the heating apparatus is controlled as a function of the position of the regulating valve. In this case a particularly simple design is obtained.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
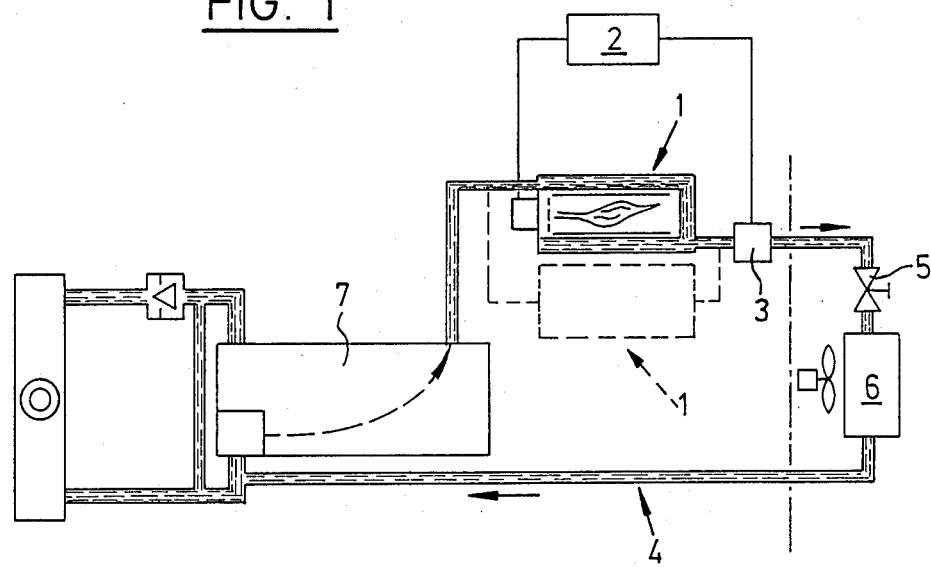
FIG. 1 is a diagrammatic view of a vehicle liquid heat exchange circuit with an incorporated heating apparatus.

As shown in the diagrammatic view of FIG. 1, a heating apparatus 1 is installed with a corresponding control device 2 in the vehicle liquid heat exchange circuit indicated, generally by 4. In the example represented, vehicle heat exchange circuit 4 is connected to the coolant circuit of an internal combustion engine 7. Further, vehicle heat exchange circuit 4 contains a vehicle heat exchanger 6, by which, for example, heat for heating the vehicle interior is radiated. As also diagrammatically represented, vehicle heat exchange circuit 4 contains a regulating valve 5, by means of which the flow of the coolant through the heat exchange circuit and through heat exchanger 6 can be controlled.

In heat exchange circuit 4, and preferably in heating apparatus 1, a liquid flow measuring device 3 is placed which detects the flow passing therethrough or acts as a threshold value switch and thus is used as a liquid flow monitor. The output of liquid flow measuring device 3 is connected to control device 2 so that heating apparatus 1 is activated and turned on only if a predetermined minimal liquid flow goes through heating apparatus 1 and through vehicle heat exchange circuit 4.

If this predetermined minimal liquid flow is not reached or exceeded, removal of sufficient heat by vehicle heat exchange circuit 4 cannot be assured when heating apparatus 1 is put into operation and heat is produced, so that overheating troubles and even damages to parts of heating apparatus 1 can occur. But, since liquid flow measuring device 3, in such a case (which might occur, for example, if a liquid pump in vehicle heat exchange circuit 4 is defective or if regulating valve 5 is closed or if, for any other reason, no liquid flow s in vehicle water circuit 4), prevents heating apparatus 1 from being turned on and put into operation, and the above-mentioned critical operating conditions can be recognized and damage to heating apparatus 1 can be avoided.

Liquid flow measuring device 3 can operate continuously or be designed as a threshold value switch. Furthermore, liquid flow measuring device 3 can carry out a volumetric flow measurement or can be designed as a turbine flow meter. The pressure difference in heating apparatus 1 or the flow rate can be used, also, for detecting the liquid flow.

The corresponding design of the liquid flow measuring device depends on the circumstances in each case so that the invention, of course, is not limited to any specific design of liquid flow measuring device.

Figure 2:
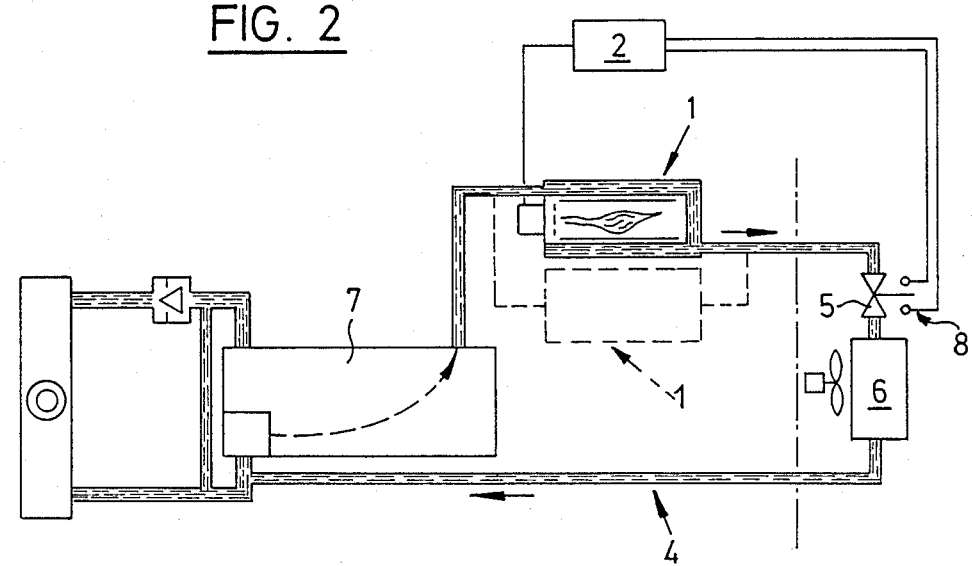
FIG. 2 is a modification of the embodiment of FIG. 1.

In FIG. 2 the same or similar parts as shown in FIG. 1 are provided with the same reference numerals. In the modified embodiment according to FIG. 2, the position of regulating valve 5 is detected, for example, with a microswitch 8 whose output is connected to control device 2. As a result, a current monitor is obtained which operates so that, in the closed position of regulating valve 5, microswitch 8, for example, is closed and, thus turning on of heating apparatus 1 by control device 2 is prevented.

Of course, the switching position of microswitch 8 can also be selected differently.

While I have show n and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. In heating apparatus, especially vehicle auxiliary heating apparatus, for incorporation in a vehicle heat exchange circuit, of the type having a burner, ignition means, pump means, a heat exchanger and a control device for controlling operation of the heating apparatus, in the improvement wherein a liquid flow measuring device is so connected to the control device that the heating apparatus, as a whole, can be activated only if the measuring device detects that a predetermined liquid flow amount within the vehicle heat exchange circuit is being exceeded, thereby preventing consumption of power and component wear as well as the creation of conditions which would otherwise cause an excessive temperature shutdown of the apparatus.

2. Heating apparatus according to claim 1, wherein the liquid flow measuring device is of a continuously operating type.

3. Heating apparatus according to claim 1, wherein the liquid flow measuring device is designed as a threshold value switch.

4. Heating apparatus according to claim 1, wherein the liquid flow measuring device is a volumetric flowmeter.

5. Heating apparatus according to claim 1, wherein liquid flow measuring device is a turbine flowmeter.

6. Heating apparatus according to claim 1, wherein the liquid flow measuring device is operable for detecting the liquid flow based upon a pressure difference.

7. Heating apparatus according to claim 1, wherein the liquid flow measuring device is operable for detecting the liquid flow as a function of flow rate.

8. Heating apparatus according to claim 7, wherein said liquid flow measuring device comprises a pitot tube arrangement for measuring the flow rate.

9. Heating apparatus according to claim 3, wherein the threshold value switch is operable in conjunction with a regulating valve in the vehicle heat exchange circuit, to form a flow monitor for controlling the control device according to the position of the regulating valve.

10. Heating apparatus according to claim 9, wherein a microswitch, having an output connected to the control device, is provided for monitoring the position of the regulating valve.

11. Heating apparatus according to claim 2, wherein the liquid flow measuring device is a volumetric flowmeter.

12. Heating apparatus according to claim 2, whereing liquid flow measuring device is a turbine flowmeter.

13. Heating apparatus according to claim 2, wherein the liquid flow measuring device is operable for detecting the liquid flow based upon a pressure difference.

14. Heating apparatus according to claim 2, wherein liquid flow measuring device is operable for detecting the liquid flow as a function of flow rate.

15. Heating apparatus according to claim 14, wherein said liquid flow measuring device comprises a pitot tube arrangement for measuring the flow rate.

16. Heating apparatus according to claim 3, wherein the liquid flow measuring device is a volumetric flowmeter.

17. Heating apparatus according to claim 3, wherein the liquid flow measuring device is a turbine flowmeter.

18. Heating apparatus according to claim 3, wherein the liquid flow measuring device is operable for detecting the liquid flow based upon a pressure difference.

19. Heating apparatus according to claim 3, wherein the liquid flow measuring device is operable for detecting the liquid flow as a function of flow rate.

20. Heating apparatus according to claim 19, wherein said liquid flow measuring device comprises a pitot tube arrangement for measuring the flow rate.

* * * * *